(12) United States Patent
MacBain et al.

(10) Patent No.: US 7,850,437 B2
(45) Date of Patent: Dec. 14, 2010

(54) MULTI-PORT SUCTION REED VALVE WITH OPTIMIZED TIPS

(75) Inventors: Scott M. MacBain, Syracuse, NY (US); Ronald J. Duppert, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 367 days.

(21) Appl. No.: 12/151,391

(22) Filed: May 6, 2008

(65) Prior Publication Data

US 2008/0277008 A1 Nov. 13, 2008

Related U.S. Application Data

(63) Continuation of application No. 09/971,301, filed on Oct. 5, 2001, now Pat. No. 7,390,176.

(51) Int. Cl.
*F16K 21/04* (2006.01)
*F04B 39/10* (2006.01)
*F04B 53/10* (2006.01)

(52) U.S. Cl. .................. 417/571; 417/560; 417/569; 137/512.15; 137/516.11

(58) Field of Classification Search .............. 417/560, 417/569, 571; 137/512.15, 512.14, 516.11, 137/855, 856, 512.4
See application file for complete search history.

(56) References Cited

U.S. PATENT DOCUMENTS

| | | | | |
|---|---|---|---|---|
| 2,725,183 | A * | 11/1955 | Hanson | 137/512.15 |
| 3,241,748 | A * | 3/1966 | Cramer et al. | 137/512.15 |
| 3,751,005 | A | 8/1973 | Earley | |
| 4,580,604 | A | 4/1986 | Kawaguchi et al. | |
| 4,723,896 | A | 2/1988 | Fritchman | |
| 4,749,340 | A * | 6/1988 | Ikeda et al. | 417/269 |
| 4,854,839 | A | 8/1989 | DiFlora | |
| 5,035,050 | A * | 7/1991 | Cowen | 29/888.02 |
| 5,421,368 | A | 6/1995 | Maalouf et al. | |
| 5,884,665 | A | 3/1999 | Thurston et al. | |
| 6,309,194 | B1 | 10/2001 | Fraser et al. | |
| 6,379,133 | B1 | 4/2002 | Hahn et al. | |
| 6,468,060 | B1 | 10/2002 | Dormer et al. | |
| 6,565,336 | B1 | 5/2003 | Fraser et al. | |
| 7,390,176 | B2 * | 6/2008 | MacBain et al. | 417/571 |

FOREIGN PATENT DOCUMENTS

JP 11270723 A 10/1999

* cited by examiner

*Primary Examiner*—Charles G Freay
(74) *Attorney, Agent, or Firm*—Cantor Colburn LLP

(57) ABSTRACT

A reed valve having a plurality of tips and associated recesses is provided as a compressor suction valve with each valve tip coacting with a suction port. The recesses are located in the housing structure defining the cylinder of the compressor and are spaced a distance on the order of 0.1 inches from the tips when the suction valve is closed. The valve is secured on one side of the cylinder and each tip is located along a line from the center of the cylinder through the center, or axis, of a suction port.

12 Claims, 3 Drawing Sheets

MULTI-PORT SUCTION REED VALVE WITH OPTIMIZED TIPS

CROSS-REFERENCE TO RELATED APPLICATION

This application is a Continuation of patent application Ser. No. 09/971,301 filed Oct. 5, 2001 now U.S. Pat. No. 7,390, 176 by Scott M. McBain and Ronald J. Duppert for MULTI-PORT SUCTION REED VALVE WITH OPTIMIZED TIPS.

BACKGROUND

A typical reciprocating compressor will have a valve plate with one, or more, suction ports and discharge ports formed therein. Normally the suction and discharge valves will be of the same general type. Each valve would be normally closed and would open due to a pressure differential across the valve in the direction of opening. Since suction valves open into the compression chamber/cylinder they generally do not have valve backers in order to minimize the clearance volume and thus deflection of the valve is not physically limited. When a suction valve opens, the valve tip(s) engage recess(es) in the housing structure defining the piston cylinder after a small amount of opening movement with further opening being due to flexure of the valve away from the valve seat and into the cylinder.

The resilience of the suction valves and adherence of the valve to the valve seat due to an oil film ("stiction") resists the opening of the suction valve. The opening movement of the suction valve before the tip(s) engage the recess(es) would only permit a restricted flow into the cylinder. So, the valve tip slams into the recess and flexes into the cylinder for every cycle. The greatest degree of flexure occurs, nominally, at the mid-point of the valve between the tip support and the pin support. Because the valve tips are located near the suction ports and because the valve tips are in a nominal line contact with the housing structure, the valve tips tend to be stressed which can result in valve failure by permitting the valve to be drawn into the cylinder.

SUMMARY

For multi-port suction valves, each valve tip and the associated tip recess are located along lines extending from the axis of the cylinder through the axis of the associated suction port. This arrangement minimizes the distance between the axis of each suction port and the tip recess and places the load due to flow through the suction ports as close as possible to the cylinder wall tip support thereby minimizing the effects of transverse bending while shortening the span from the pins to the tips. This combination yields the valve with the lowest maximum stress.

It is an object of this invention to reduce maximum operating stress on suction valves.

It is another object of this invention to optimize valve tip and valve tip recess locations. These objects, and others as will become apparent hereinafter, are accomplished by the present invention.

Basically, a valve tip and its associated recess are provided along each line from the center of the cylinder through the center, or axis, of a suction port.

BRIEF DESCRIPTION OF THE DRAWINGS

For a fuller understanding of the present invention, reference should now be made to the following detailed description thereof taken in conjunction with the accompanying drawings wherein.

DETAILED DESCRIPTION

Figure 1:
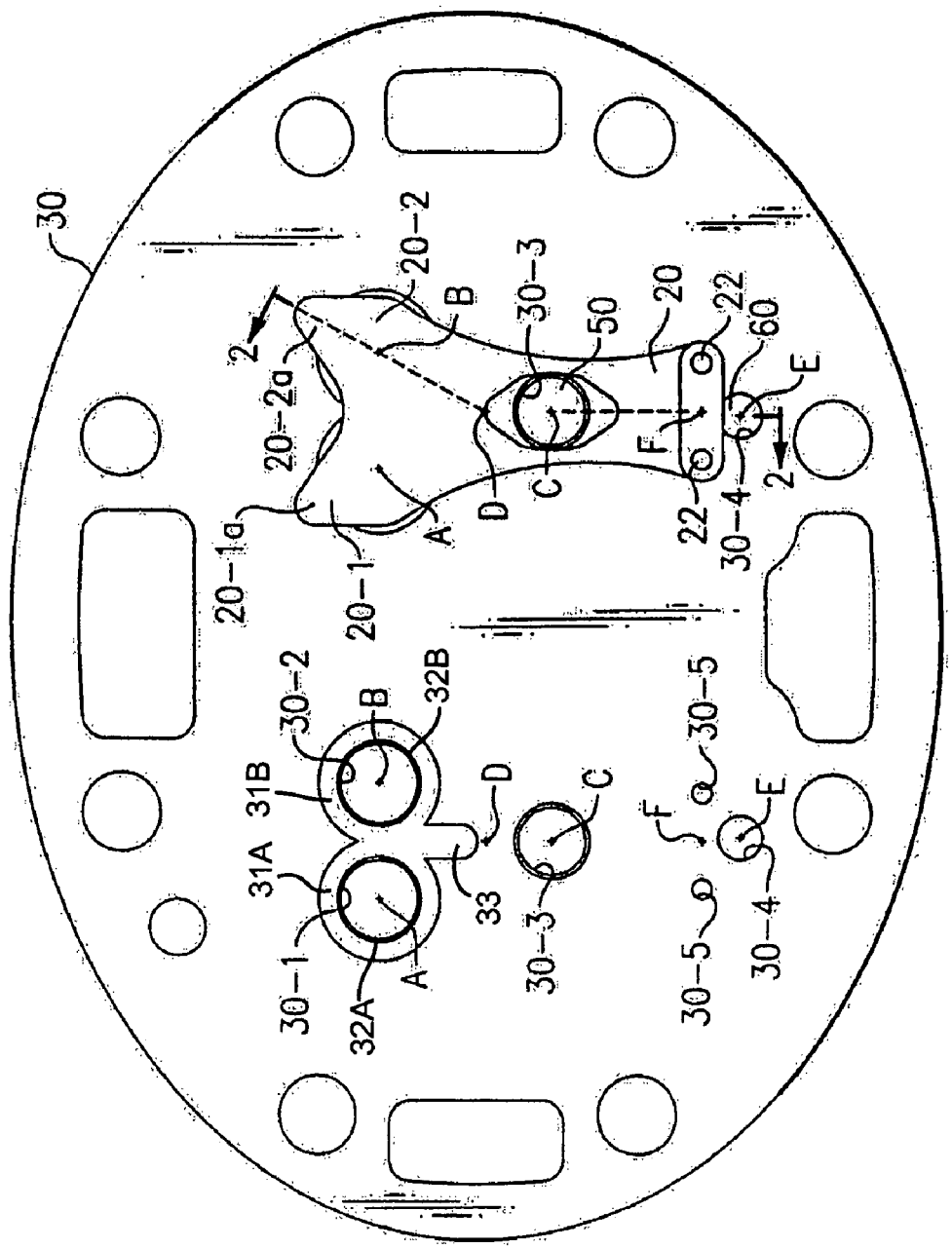
FIG. 1 is a cylinder side view of a valve plate showing one of two suction valves in place.
Figure 2:
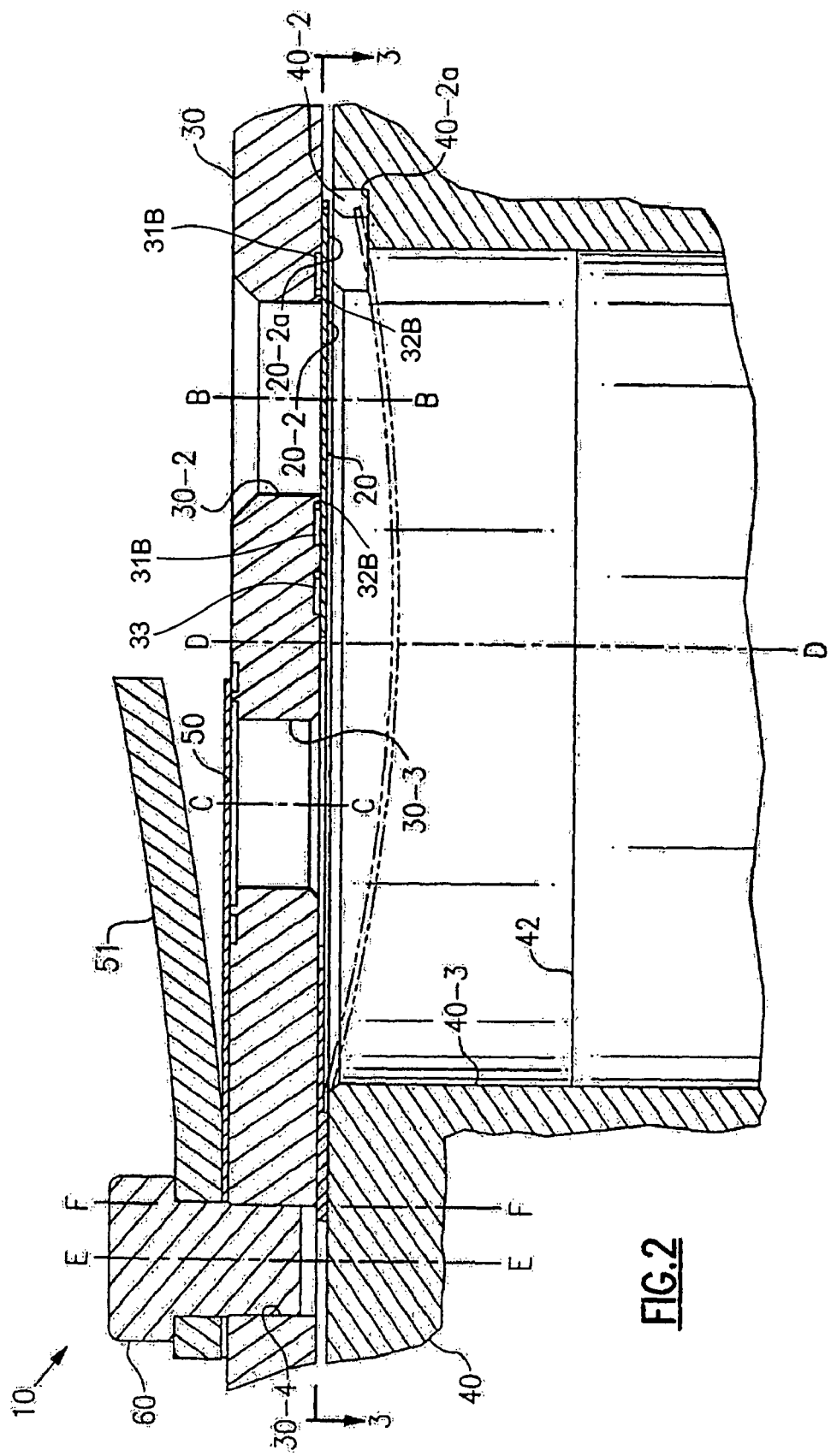
FIG. 2 is a sectional view taken along line 2-2 of FIG. 1.

In FIGS. 1 and 2, the numeral 30 generally designates a valve plate associated with two cylinders of a reciprocating compressor. Two, or more, suction passages 30-1 and 30-2 having axes A and B, respectively, and at least one discharge passage 30-3 having an axis C are associated with each cylinder. The point D corresponds to the axis of a cylinder. The point E corresponds to the axis of the bore 30-4 and pin/bolt 60 holding valve plate 30, and discharge valve 50 in place when a single bolt 60 is used. If more than one bolt 60 is used, axis E would be at a mid-point of a line going through their centers. Pins 22 are received in bores 30-5 and secure suction valve 20 in place. Suction valve 20, in seated position, contacts valve seats 32A and 32B. Each valve seat is defined by grooves 31A, 31B encircling suction passages 30-1 and 30-2 respectively, the grooves formed in the surface of the valve plate 30 such that the surface of the valve seats 32A, 32B are generally coplanar with the valve plate 30 surface. A relief 33 in the valve plate surface is shown extending beyond the grooves 31A, 31B from the location where the grooves 31A, 31B intersect between the suction passages 30-1, 30-2. Axis F is the mid-point between the axes of pins 22 and their bores 30-5 for each suction valve 20. The axes A, B, C, D, E and F are illustrated as points or lines, even in the absence of the related structure, because of their relationships relative to the present invention. Referring specifically to FIG. 1, suction passages 30-1 and 30-2 are symmetrically located relative to a plane defined by axes C, D, E and F. It will be noted that the plane defined by axes C, D, E and F divides suction valve 20 into two symmetrical portions but that only two of the axes are necessary to define the plane. If there were two discharge passages associated with a cylinder, the plane of symmetry would be defined by axis D and E together with a mid-point of the axes of the two discharge passages. It will be noted that suction passages 30-1 and 30-2 are also symmetrically located as to suction valve 20 when it is in place. Discharge valve 50 is only visible through discharge passage 30-3. Suction valve 20 has two arms or projections, 20-1 and 20-2, respectively, which, as noted, are symmetrical with respect to suction valve 20. The first arm 20-1 extends in the direction of a plane defined by axes A and D and terminates in a tip 20-1a which is symmetrical relative to the plane defined by axes A and D. The second arm 20-2 extends in the direction of a plane defined by axes B and D and terminates in a tip 20-2a which is symmetrical relative to the plane defined by axes B and D.

Figure 3:
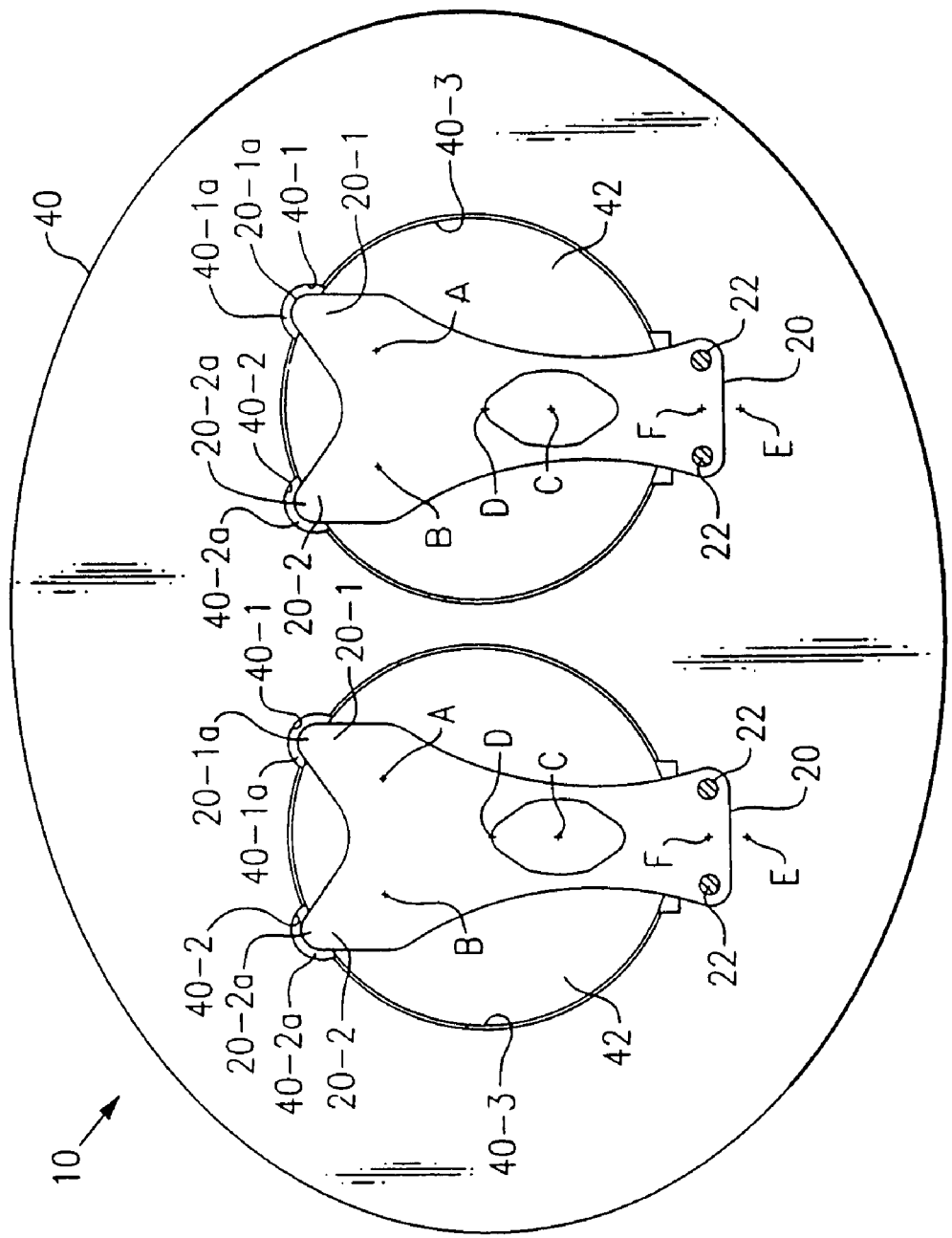
FIG. 3 is a view taken along line 3-3 of FIG. 2 and with the second suction valve in place.

In FIGS. 2 and 3, the numeral 10 generally designates a reciprocating compressor with two cylinders being illustrated. As is conventional, each cylinder of compressor 10 has a suction valve 20 and a discharge valve 50, which are illustrated as reed valves, as well as a piston 42 which is located in bore 40-3 in housing structure 40. Valves 20 and 50 coact with valve plate 30 in their valving action. Discharge valve 50 has a backer 51 which limits the movement of valve 50 and is normally configured to dissipate the opening force applied to valve 50 via discharge passage 30-3 over its entire opening movement. When the valve 20 is in the open position which is shown in phantom in FIG. 2, tips 20-1a and 20-2a engage ledges 40-1a and 40-2a in recesses 40-1 and 40-2, respectively, in housing structure 40 which act as valve stops. Ledges 40-1a and 40-2a are engaged after an opening movement of suction valve 20 on the order of 0.1 inches, in order to minimize the clearance volume, with further opening movement occurring by flexure of valve 20 as shown in phantom. Specifically, movement of valve 20 is as a cantilevered beam until tips 20-1a and 20-2a engage ledges 40-1a and 40-2a, respectively. At this point there are three locations of support. The first is at the secured end of valve 20 and is in the nature of a line or thin band contact with housing structure 40 symmetrically located with respect to a plane defined by axes C, D, E and F and tending to produce the flexure shown in phantom in FIG. 2. This flexure is essentially about an axis perpendicular to the plane defined by axes C, D, E and F. At one level tips 20-1a and 20-2a effectively support the free end of the valve 20 to produce the flexure illustrated in phantom. This, however, is the result of the individual coaction of tips 20-1a and 20-2a with ledges 40-1a and 40-2a, respectively. As best shown in FIG. 3, the portions of tips 20-1a and 20-2a overlying ledges 40-1a and 40-2a, respectively, are the narrowest portions of valve 20 and are symmetrical about the planes defined by axes A and D and axes B and D, respectively. Being narrow, tips 20-1a and 20-2a are prone to being flexed. Due to the symmetry, tips 20-1a tends to flex about an axis transverse to the plane defined by axes A and D and tips 20-2a tends to flex about an axis transverse to the plane defined by axes B and D.

Because flexure relative to tips 20-1a and 20-2a is about axes transverse to planes defined by axis A and D and axes B and D, respectively, the greatest amount of movement of tips 20-1a and 20-2a due to flexure is required to draw valve 20 into bore 40-3. Because of the symmetry of tips 20-1a and 20-2a relative to the planes defined by axis A and D and axes B and D, the forces due to the gas flow through the suction ports 30-1 and 30-2 also act symmetrically. Stress is minimized by minimizing the effects of transverse bending by minimizing the distance between the applied load on the valve due to gas flow and the valve tip support by ledges 40-1a and 40-2a.

In operation, suction valves 20 are unseated during the suction stroke when the pressure differential across valves 20 is sufficient to overcome the inherent spring force of the valve 20, adhesion forces, etc. Upon the unseating of a valve 20, impingement by the suction flow through suction passages 30-1 and 30-2 flexes valve 20 relative to the fixed end of valve 20 until tips 20-1a and 20-2a engage ledges 40-1a and 40-2a of recesses 40-1 and 40-2, respectively. At this point there is no longer flexure solely relative to a single fixed end. The major flexure is at a, nominal, mid-point between the fixed end and the tips 20-1a and 20-2a which engage ledges 40-1a and 40-2a about an axis transverse to a plane defined by axes C and D. Additionally, there is flexure by each of the tips 20-1a and 20-2a and/or by their respective arms and 20-1 and 20-2. Tip 20-1a flexes about an axis transverse to a plane defined by axes A and D and tip 20-2a flexes about an axis transverse to a plane defined by axes B and D. The flexure of tips 20-1a and 20-2a causes their movement relative to ledges 40-1a and 40-2a, respectively, to be directly towards axes A and B, respectively, which are at a minimum distance such that the maximum stress produced is reduced.

It will be noted that movement of tips 20-1a and 20-2a, to permit flexure, is along planes A-D and B-D, respectively, which is also along a radius of bore 40-3. This results in movement along planes which results in the tips 20-1a and 20-2a being centered relative to recesses 40-1 and 40-2. Accordingly, clearances around the tips 20-1a and 20-2a can be minimized thereby reducing the clearance volume and forces are balanced on the tips 20-1a and 20-2a in their engagement with recesses 40-1a and 40-2a, respectively.

Although the present invention has been described with reference to preferred embodiments, workers skilled in the art will recognize that changes may be made in form and detail without departing from the spirit and scope of the invention.

The invention claimed is:

1. A compressor valve system, comprising:
   a valve plate having first and second generally parallel major surfaces;
   a first passage and a second passage extending through the valve plate from the first surface to the second surface;
   a groove in the first surface encircling each of the passages to define a valve seat surface circumscribing each passage, the valve seat surface being generally coplanar with the first surface of the valve plate;
   a relief in the first surface of the valve plate, the relief positioned along a centerline between the first passage and the second passage, wherein the relief intersects with and extends beyond the groove along the centerline; and
   a valve movable between a closed position in contact with the valve seat surface and an open position spaced from the valve seat surface.

2. The compressor valve system of claim 1, wherein the valve is a reed valve.

3. The compressor valve system of claim 2, wherein the reed valve is fixed at one end to the valve plate.

4. The compressor valve system of claim 3, wherein the reed valve is a suction valve.

5. The compressor valve system of claim 4, wherein the passages are suction ports.

6. A compressor comprising:
   a housing structure defining a cylinder with a cylinder axis, the housing structure further defining a plurality of ledges circumferentially spaced about a portion of the cylinder;
   a piston located in the cylinder;
   a valve plate attached to the housing structure at an end of the cylinder and spaced from the plurality of ledges, the valve plate comprising:
   first and second generally parallel major surfaces;
   a first suction port and a second suction port extending through the valve plate from the first surface to the second surface, each suction port having a suction port axis generally coaxial with the cylinder axis;
   at least one discharge port extending through the valve plate from the first surface to the second surface, the discharge port having an axis generally coaxial with the cylinder axis;
   a groove in the first surface encircling each of the suction ports to define a valve seat surface concentric with each suction port, the valve seat surface being generally coplanar with the first surface of the valve plate;
   a relief in the first surface of the valve plate, the relief positioned along a line of symmetry between the first passage and the second passage, wherein the relief intersects with and extends beyond the groove along the line of symmetry; and a suction valve secured at a location on the first surface of the valve plate and adapted to move in and out of seating engagement with the valve seat surface, the suction valve having a plurality of arms having free ends terminating in tips that can engage the ledges when the suction valve is out of seating engagement with the valve seat surface.

7. The compressor of claim 6, wherein the line of symmetry is defined by the discharge port axis and the location where the suction valve is secured on the first surface of the valve plate.

8. A compressor valve system, comprising:

a valve plate having first and second generally parallel major surfaces;

a first passage extending through the valve plate from the first surface to the second surface of the valve plate;

a first valve seat surrounding the first passage, wherein the first valve seat comprises a surface that is generally coplanar with the first surface of the valve plate;

a first groove in the first surface of the valve plate, wherein the first groove surrounds the first valve seat;

a second passage extending through the valve plate from the first surface to the second surface of the valve plate;

a second valve seat surrounding the second passage, wherein the second valve seat comprises a surface that is generally coplanar with the first surface of the valve plate;

a second groove in the first surface of the valve plate, wherein the second groove surrounds the second valve seat;

a relief in the first surface of the valve plate extending from the first and second grooves and generally aligned with the region located between the first and second passages where the first and second grooves intersect, the relief positioned along a line of symmetry between the first passage and the second passage, wherein the relief intersects with and extends beyond the grooves along the line of symmetry; and a valve movable between a closed position in contact with the first and second valve seat surfaces and an open position spaced from the first and second valve seat surfaces.

9. The compressor valve system of claim 8, wherein the valve is a reed valve.

10. The compressor valve system of claim 9, wherein the reed valve is fixed at one end to the first surface of the valve plate.

11. The compressor valve system of claim 10, wherein the reed valve functions as a suction valve.

12. The compressor valve system of claim 11, wherein the passages function as suction ports.

\* \* \* \* \*